(12) United States Patent
Krausz et al.

(10) Patent No.: US 8,582,610 B2
(45) Date of Patent: Nov. 12, 2013

(54) INTRA-CAVITY GENERATION OF PULSED COHERENT RADIATION IN THE UV OR XUV WAVELENGTH RANGE

(75) Inventors: Ferenc Krausz, Garching (DE); Jens Rauschenberger, Garching (DE); Alexander Apolonskiy, Garching (DE)

(73) Assignees: Max-Planck-Gesellschaft zur Forderung der Wissenschaften e.V. (DE); Ludwig-Maximillians-Universitat Muenchen (DE)

( * ) Notice: Subject to any disclaimer, the term of this patent is extended or adjusted under 35 U.S.C. 154(b) by 424 days.

(21) Appl. No.: 12/864,040

(22) PCT Filed: Jan. 23, 2009

(86) PCT No.: PCT/EP2009/000434
§ 371 (c)(1),
(2), (4) Date: Sep. 30, 2010

(87) PCT Pub. No.: WO2009/092600
PCT Pub. Date: Jul. 30, 2009

(65) Prior Publication Data
US 2011/0013653 A1    Jan. 20, 2011

Related U.S. Application Data

(60) Provisional application No. 61/062,372, filed on Jan. 25, 2008.

(30) Foreign Application Priority Data

Jan. 25, 2008 (EP) .................................. 08001428

(51) Int. Cl.
*H01S 3/10* (2006.01)

(52) U.S. Cl.
USPC ............ 372/22; 372/21; 372/29.023; 372/92

(58) Field of Classification Search
USPC ...................... 372/5, 21–22, 29.023
See application file for complete search history.

(56) References Cited

U.S. PATENT DOCUMENTS

| 5,734,503 | A | 3/1998 | Szipócs et al. |
| 6,088,379 | A * | 7/2000 | Owa et al. ...................... 372/97 |

(Continued)

FOREIGN PATENT DOCUMENTS

CN    1905296 A    1/2007

OTHER PUBLICATIONS

A. Agnesi et al., "Self-Stabilized and Dispersion-Compensated Passively Mode-locked Yb. Yurium Aluminum Garnet Laser," *Applied Physics Letters*, 2005 vol. 86, 171105.

(Continued)

*Primary Examiner* — Dung Nguyen
(74) *Attorney, Agent, or Firm* — DLA Piper LLP (US)

(57) ABSTRACT

A radiation source that provides high order harmonic radiation (HHG radiation) in an UV or XUV wavelength range comprising a resonant cavity that guides laser light pulses that includes at least two cavity mirrors, a first non-linear medium that provides the HHG radiation by harmonic generation based on an interaction of the laser light pulses with the first non-linear medium, wherein the first non-linear medium is arranged in the resonant cavity in an environment of reduced pressure, and a second non-linear medium arranged in the resonant cavity and adapted for at least one of amplifying the laser light pulses and phase locking longitudinal modes of the laser light pulses in the resonant cavity.

6 Claims, 2 Drawing Sheets

(56) References Cited

U.S. PATENT DOCUMENTS

| | | | |
|---|---|---|---|
| 7,405,868 B2* | 7/2008 | Kaertner et al. | 359/330 |
| 2002/0080841 A1* | 6/2002 | Yin et al. | 372/75 |
| 2003/0214984 A1* | 11/2003 | Grossman et al. | 372/22 |
| 2004/0095634 A1* | 5/2004 | Paschotta et al. | 359/330 |
| 2004/0146076 A1* | 7/2004 | Dudley et al. | 372/22 |
| 2005/0238071 A1 | 10/2005 | Oka | |
| 2006/0268949 A1 | 11/2006 | Gohle et al. | |
| 2006/0280217 A1* | 12/2006 | Zervas et al. | 372/72 |
| 2007/0223541 A1* | 9/2007 | Van Saarloos | 372/22 |

OTHER PUBLICATIONS

A. Gisen et al., "Scalable Concept for Diode-Pumped High-Power Solid-State Lasers," Applied Physics B, Lasers and Optics, vol. 58, 1994, pp. 365-372.

I.D. Jung et al., "Self-starting 6.5-fs pulses from a Ti:sapphire laser," Optics Letters, vol. 22, No. 13, Jul. 1, 1997, pp. 1009-1011.

I. Juwiler et al., "Efficient quasi-phase-matched frequency doubling with phase compensation by a wedged crystal in a standing-wave external cavity," Optics Letters, vol. 24, No. 17, Sep. 1, 1999, pp. 1236-1238.

Y. Chen et al., "Dispersion-managed mode locking," J. Opt. Soc. Am. B, vol. 16, No. 11, 1999, pp. 1999-2004.

Thomas Brabec et al., "Intense few-cycle laser fields: Frontiers of nonlinear optics," Review of Modern Physics, vol. 72, No. 2, Apr. 2000, pp. 545-591.

R. Paschotta et al., "Passive mode locking with slow saturable absorbers," Applied Physics B, Lasers and Optics, vol. 73, 2001, pp. 653-662.

R. Jason Jones et al., "Phase-Coherent Frequency Combs in the Vacuum Ultraviolet via High-Harmonic Generation inside a Femtosecond Enhancement Cavity," Physical Review Letters, vol. 94, May 20, 2005, pp. 193201-1-193201-4.

Christoph Gohle et al., "A frequency comb in the extreme ultraviolet," Nature, vol. 436, Jul. 14, 2005, pp. 234-237.

Giesen, A et al., "Thin-Disk Lasers Cow of Ages" *Photonics Spectra*, May 2007, Cover and pp. 52-58.

Brabec, T et al., "Intense Few-Cycle Laser Fields. Frontiers of Nonlinear Optics," *Reviews of Modern Physics*, Apr. 2000, vol. 72, No. 2, pp. 545-591.

* cited by examiner

INTRA-CAVITY GENERATION OF PULSED COHERENT RADIATION IN THE UV OR XUV WAVELENGTH RANGE

RELATED APPLICATIONS

This is a §371 of International Application No. PCT/EP2009/000434, with an international filing date of Jan. 23, 2009 (WO 2009/092600 A1, published Jul. 30, 2009), which is based on European Patent Application No. 08001428.5, filed Jan. 25, 2008, and US Provisional Application No. 61/062,372, filed Jan. 25, 2008, the subject matter of which is incorporated by reference.

TECHNICAL FIELD

This disclosure relates to a radiation source, which is adapted for generating pulsed high order harmonic radiation (or: HHG radiation) with a wavelength in the UV or XUV wavelength range inside a resonator. In particular, the disclosure relates to a radiation source generating the pulsed HHG radiation by high order harmonic generation as a result of an interaction of laser light pulses with an optically non-linear medium. Furthermore, the disclosure relates to a method of providing pulsed radiation by the harmonic generation process. Preferred applications result in particular in microscopy and lithography techniques as well in medicine and material sciences.

BACKGROUND

Frequency conversion of laser radiation based on harmonic generation is generally known. As basic examples, frequency doubling or tripling can be obtained with second or third order harmonic generation (SHG, THG) using solid optically non-linear crystals. For conversions to higher frequencies, towards the XUV and soft x-ray spectral region, high order harmonic generation is realized (n-th harmonic generation, n>5) using non-linear processes in gas targets. High order harmonic generation has been described by T. Brabec and F. Krausz in "Reviews of Modern Physics" (vol. 72, 2000, p. 545 to 591, in particular p. 571). While SHG or THG crystals have a large conversion efficiency of up to 50%, gas targets have an extremely low conversion efficiency in the range of $10^{-9}$ to $10^{-7}$ for the XUV (near 13 nm or below).

Even those low conversion efficiencies were generated only with complex and expensive laser amplifier systems. Those high-energy systems necessarily reduce the pulse repetition rate by several orders of magnitude, typically to the kHz range. Several scientific experiments and technological processes benefit from HHG radiation with increased repetition rate. Exemplarily, in XUV spectroscopy weak signals have to be accumulated for days with the current low-repetition laser systems. The collecting (integration) time can be shortened by a factor of up to 1000 by providing the HHG radiation at the full, original repetition rate.

Previous attempts to increase the conversion efficiency were based on increasing the gas density of the gas target or the so-called quasi phase matching (QPM) in hollow fibers. Both techniques can be applied to a limited extent only, as the increased gas density can reduce the HHG efficiency due to increased absorption and QPM is not well-adapted for gas targets.

Another technique of increasing the conversion efficiency is based on intra-cavity generation of pulsed HHG radiation in the extreme ultraviolet spectral range as described in US 2006/0268949 A1 (see also C. Gohle et al. in "Nature", vol. 436, 14 Jul. 2005, p. 234; or R. J. Jones et al. in "Physical Review Letters", vol. 94, 2005, p. 193201-1). The HHG radiation is provided inside a resonator by a harmonic generation process in an optically non-linear medium, like a gas jet, which is irradiated with laser light pulses. The laser light pulses are provided in a resonant cavity wherein, due to a coherent enhancement (coherent addition), the laser light pulses have a peak intensity which is large enough to drive the harmonic generation process. The enhancement is obtained by a precise adjustment of the resonant cavity and a driving laser source relative to each other so that high intensity laser light pulses are provided while preserving the repetition rate of the driving laser source.

The aforementioned conventional technique of generating HHG radiation in an external cavity has two limitations which have restricted the further development of this technique. The limitations are related to the enhancement factor of the resonant cavity and dispersion effects in the resonant cavity. In particular, the coherent addition requires that the pulse shape is maintained after each resonator round trip.

First, the factor of enhancement (average power circulating inside the resonant cavity versus incident average power) can be limited by intrinsic cavity losses, like mirror absorption, scattering in air, etc. With the conventional resonant cavity, the maximum achievable enhancement factor is given by $P=1/(1-r^2)$, wherein r is the product of all mirror reflectivities and additional scattering losses in the resonant cavity.

Second, the enhancement is constrained to frequency components of the incident laser pulses from the driving laser source that fulfill the requirement of vanishing dispersion inside the resonant cavity. If this condition is not met, spectral clipping will occur, resulting in circulating pulses with a longer pulse width. Despite recent advances in mirror coating and characterization techniques, this criterion is still a factor that limits enhancement and the bandwidth supported by the resonant cavity. Due to this bandwidth-limitation, only pulses longer than about 30 fs have been used in conventional techniques.

Due to the above limitations (intra-cavity circulating power, pulse duration), the application of the conventional technique for generating pulsed HHG radiation is restricted to relative low intensities with pulse durations in the fs-range. However, for the expected applications of XUV pulses, driving pulses with a sub-10 fs duration are required, in particular for producing attosecond pulses of coherent radiation by harmonic generation.

Another general disadvantage of the conventional radiation sources for generating pulsed HHG radiation in an external cavity is given by the fact that a combination of the driving laser source and the external resonant cavity, as described, e.g., in US 2006/0268949 A1, represents a complex optical set-up, which requires an extensive and time-consuming adjustment. Therefore, the application of the conventional radiation sources in a practical device, like a microscope or lithography apparatus, is restricted.

It could therefore be helpful to provide an improved radiation source for providing pulsed HHG radiation which is capable of overcoming limitations of the conventional techniques. In particular, the radiation source is to be capable of generating pulsed radiation in the wavelength ranges of UV to XUV or even to X-ray wavelengths with increased intensity, reduced pulse duration and/or increased repetition rate. Furthermore, it could be helpful to provide an improved method for providing pulsed HHG radiation which is characterized by an increased intensity and/or reduced pulse duration, while preserving the repetition rate of the driving laser. It could further be helpful to provide the improved radiation source or radiation generating method with an optical set-up having a reduced complexity, which in particular allows the generation of the pulsed coherent radiation under practical conditions with reduced requirements as to adjustment and maintenance.

SUMMARY

We provide a radiation source that provides high order harmonic radiation (HHG radiation) in an UV or XUV wavelength range including a resonant cavity that guides laser light pulses and includes at least two cavity mirrors, a first non-linear medium that provides the HHG radiation by harmonic generation based on an interaction of the laser light pulse with the first non-linear medium, wherein the first non-linear medium is arranged in the resonant cavity in an environment of reduced pressure, and a second non-linear medium arranged in the resonant cavity and adapted for at least one of amplifying the laser light pulses and phase locking longitudinal modes of the laser light pulses in the resonant cavity.

We also provide a method of generating high order harmonic pulsed radiation (HHG radiation) including providing laser light pulses in a resonant cavity including at least two cavity mirrors, providing the HHG radiation by harmonic generation based on an interaction of the laser light pulses with a first non-linear medium contained in the resonant cavity, wherein the first non-linear medium is arranged in an environment of reduced pressure, and subjecting the laser light pulses to at least one of amplifying the laser light pulses and phase locking longitudinal modes of the laser light pulses using a second non-linear medium which is arranged in the resonant cavity.

BRIEF DESCRIPTION OF THE DRAWINGS

Details and advantages are described in the following with references to the attached drawings, which show in.

DETAILED DESCRIPTION

Figure 1:
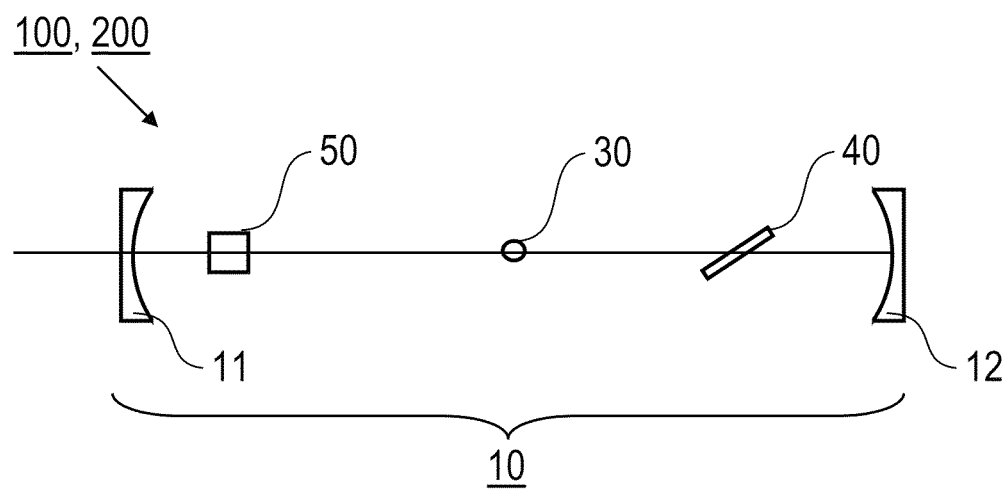
FIG. 1: a schematic illustration of the general structure principle of a radiation source according to first and second aspects.

According to a first aspect, we provide a generic radiation source having a resonant cavity with at least two cavity mirrors and a non-linear medium adapted for harmonic generation of pulsed coherent radiation driven with laser light pulses circulating in the resonant cavity, wherein another non-linear medium is included in the resonant cavity, which is adapted for introducing at least one of a predetermined gain and predetermined dispersion into the resonant cavity. Accordingly, an amplification of the laser light pulses and/or a phase locking of longitudinal modes of the laser light pulses circulating in the resonant cavity is obtained.

According to a second aspect, we provide a method of generating pulsed radiation by high order harmonic generation using a non-linear medium in a resonant cavity, wherein laser light pulses circulating in the resonant cavity and driving the harmonic generation process are subjected to at least one of an amplification and a longitudinal mode phase locking. With the disclosure, another non-linear medium arranged in the resonant cavity is used for generating (enhancement, amplification) and shaping (influencing spectral distribution) of the laser light pulses in the resonant cavity.

With an addition of a predetermined amount of gain to the resonant cavity, the effective losses can be reduced significantly. Advantageously, the effective losses can be made to vanish. Consequently, the enhancement of laser light pulses in the resonant cavity can be increased significantly. We found that the enhancement can be increased by a factor of 20 or even higher compared with the coherent addition without gain. The gain can also compensate the losses introduced by the out-coupling method for the generated HHG radiation. A higher flexibility with regard to the choice of out-coupling method is obtained.

Dispersion management in the cavity by customizing the dispersion properties of high-reflecting cavity mirrors is not able to maintain the pulse properties when the pulse duration approaches 10 fs or less. The accuracy of dispersion compensation is elevated substantially for high finesse cavities, as the pulses undergo a large number of roundtrips. We found that, if the predetermined (controlled) amount of non-linearity is added to the resonant cavity, the material dispersion in the resonant cavity can be counter-acted and a steady-state can be reached, wherein the pulse shape remains the same after each round-trip of the laser light pulses through the resonant cavity. We found that the interplay between material dispersion and non-linearities can be used in the same way as in a mode locked femtosecond oscillator (as described with regard to dispersion-managed mode-locking by Y. Chen et al. in "J. Opt. Soc. Am. B", vol. 16, 1999, p. 1999). In particular, the addition of a predetermined optical non-linearity to the resonant cavity allows to subject the laser light pulses to a so-called soliton mode locking (see R. Paschotta et al. ("Appl. Phys. B", vol. 73, 2001, p. 653 to 662). Typically, the net dispersion of the cavity has to be negative for this purpose. This can be reached by using chirped multilayer mirrors as cavity mirrors, as described in U.S. Pat. No. 5,734,503.

In particular, addition of the non-linear medium effects a phase locking of longitudinal laser light pulse modes so that a compensation of second- and fourth-order dispersion in a parameter space can be reached which is large enough for providing the bandwidth required in practical applications of the pulsed coherent radiation.

"Resonant cavity" indicates any type of light resonator which is capable of being locked to an external laser light source or which provides a resonator of a laser light source as such. The non-linear medium (in the following: first non-linear medium) being arranged for providing the pulsed coherent radiation in the UV or XUV wavelength range is arranged in an environment of reduced pressure.

"Environment of reduced pressure" indicates that at least the space into which the HHG radiation is emitted from the first non-linear medium has a pressure lower than atmospheric pressure. The space is evacuated, so that pulsed HHG radiation (also called: high harmonic pulses) can be transmitted with an intensity as required for a specific application of the radiation source. In particular, a residual pressure can be present. Preferably, the first non-linear medium is arranged in a vacuum environment, e.g., in a vacuum chamber. The vacuum environment has a reduced pressure of, e.g., $10^{-2}$ mbar or lower (down to high vacuum or even ultra-high vacuum).

"First non-linear medium" indicates any type of optically non-linear material, which is capable of emitting pulsed HHG radiation (coherent pulses in the UV or XUV range, in preferably from 2 nm to 150 nm, particular preferred from 10 nm to 60 nm) as a result of harmonic generation using the laser light pulses circulating in the resonant cavity. As a preferred example, the first non-linear medium comprises a liquid or gaseous jet or film of a target material, as described, e.g., in US 2006/0268949 A1. The first non-linear medium may comprise, e.g., a rare gas.

Furthermore, "second non-linear medium" indicates any type of optically non-linear material which is capable of introducing a predetermined light amplification gain (laser gain) and/or non-linearity into the resonant cavity. The second non-linear medium can comprise a solid, liquid, or gaseous material. Generally, there are no limitations with regard to the shape and geometric dimension of the second non-linear medium. As an example, optical non-linearity can be introduced into the resonant cavity by injecting a certain gas, e.g., nitrogen, into the resonant cavity or by placing a solid component, e.g., sapphire, in the beam path of the laser light pulses circulating in the resonant cavity. Furthermore, the second non-linear medium may comprise one single component or multiple components arranged in the resonant cavity.

If the second non-linear medium consists of one single optically non-linear component which is capable of introducing the predetermined gain and optical non-linearity into the resonant cavity, advantages with regard to a compact structure of the optical set-up can be obtained. With this variation, only one non-linear component is arranged additionally to the first non-linear medium in the cavity. As a further advantage, adjustment of the resonant cavity is facilitated.

Alternatively, the second non-linear medium may comprise multiple optically non-linear components, each adapted to introduce a predetermined gain or a predetermined optical non-linearity into the resonant cavity. In this case, the complexity of the optical set-up is slightly increased. However, as an advantage, the number of degrees of freedom to control the resonant cavity is increased. With the preferred case of providing a first optically non-linear component for amplifying the laser light pulses and a second optically non-linear component for phase-locking the longitudinal modes of the laser light pulses, the adjustment of pulse shaping and amplifying can be improved.

As a further alternative, the second non-linear medium may comprise multiple optically non-linear components, each adapted to introduce a predetermined gain and a predetermined optical non-linearity into the resonant cavity.

The optical non-linearity introduced by the second non-linear medium is selected such that it matches to the pulse shape of the circulating laser light pulses, in particular the laser light pulses injected from an external seed oscillator (driving laser source) as well as to the dispersion in the resonant cavity. As a particularly advantageous result, we found that this matching to both conditions is possible with one single non-linear component. Contrary to dispersion management in conventional laser oscillators, the non-linearity is matched to both conditions rather than to one condition (dispersion in the resonator) only.

Using a gas as the second non-linear medium provides the advantages of reducing unintended influences on the dispersion management by the second non-linear medium. As an example, a gaseous second non-linear medium can comprise neon or argon. As a further advantage, adjusting the gain parameter or the dispersion parameter of the gaseous second non-linear medium can be facilitated by adjusting the pressure of the gaseous medium.

The second non-linear medium may have a variable optical non-linearity. The optical non-linearity parameter of the second non-linear medium can be selected for matching or adjustment purposes. Preferably, the optical non-linearity parameter can be varied by changing at least one of the thickness and pressure of the second non-linear medium. With a solid material, the second non-linear medium preferably has a wedge shape. Advantageously, the wedge shape allows an adjustment movement of the second non-linear medium in the resonant cavity without infringing the Brewster condition of arranging the second non-linear medium in the resonator. As a further advantage, providing the second non-linear medium with a variable optical non-linearity allows the provision of a control loop for adjusting the second non-linear medium in the cavity and for setting optimum conditions of amplification and/or phase locking of the circulating laser light pulses.

If the second non-linear medium is contacting one of the cavity mirrors of the resonant cavity, advantages in terms of stable operation conditions and increased effectiveness are obtained. Contacting the mirror provides, in particular, a thermal contact so that the second non-linear medium can be cooled with the cavity mirror. Accordingly, thermal effects, e.g., formation of a thermal lens, in the material of the second non-linear medium can be avoided.

The second non-linear medium may comprise a laser material. The term "laser material" refers to any material which is capable of providing a stimulated emission of radiation. Using a laser material has the particular advantage that laser materials are well investigated with regard to their amplification and dispersion parameters. Preferably, the second non-linear medium comprises a crystal of a disk laser (or: thin disk laser).

"Thin disk laser" refers to any structure where a one-dimensional heat conduction in parallel to the beam direction through the crystal in the resonant cavity is realized. With a thin disk laser medium in thermal contact with at least one of the cavity mirrors and an efficient heat sink (so-called active mirror), temperature gradients perpendicularly to the beam direction can be excluded. Advantageously, any unintended effect of a thermal lens in the second non-linear medium can be avoided during any operation condition of the resonator cavity.

Using a thin disk as a gain material has the additional advantage of keeping the dispersion introduced by the gain medium as small as possible. To this end, the thin disk has a thickness preferably selected in the range of 10 μm to 1 mm, e.g., 50 μm to 500 μm. As a further advantage, using a disk laser material allows scaling radiation generation up to enlarged intensities. In this regard, preferably disk laser materials are used, which have been described by A. Giesen et al. in "Applied Physics B", vol. 58, 1994, p. 365, and in "Photonics Spectra", May 2007, p. 52 to 58. Furthermore, these disk laser materials can comprise, e.g., Ti:sapphire, Yb:YAG, Yb:YLF, Yb:KGW, Yb:KYW or Yb-doped crystals.

Preferably, the resonant cavity includes imaging mirrors having a curved reflecting surface so that at least one focus position is included in the resonant cavity. If at least one of the first and second non-linear media is arranged in at least one focus position of the resonant cavity, particular advantages in terms of efficiency of the function of the respective non-linear medium are obtained. In particular, the efficiency of laser pulse amplification and/or phase locking or the efficiency of the harmonic generation can be improved with the provision of the non-linear media at focus positions of the resonant cavity. Typically, the beam of the laser pulses in the resonant cavity has a diameter in the range of 100 μm to 5 μm at the focus position.

Another particular advantage is related to the fact that the structure of the resonant cavity can be selected in dependence of the requirements of the particular application of the radiation source and radiation generating method.

The resonant cavity may be an external cavity (secondary cavity, enhancement cavity) which is arranged for a pulse superposition by coherent addition of light pulses. The enhancement cavity may be a mirror arrangement being optically coupled with a driving laser pulse source providing the laser light pulses to be enhanced in the resonant cavity. In other words, the resonant cavity is an external cavity coupled with the laser pulse source. Examples of enhancement cavities are described, e.g., in the above publications of C. Gohle et al. or R. J. Jones et al. Providing the resonant cavity as an external enhancement cavity has a particular advantage in terms of using conventional laser pulse sources, in particular laser amplifier systems for driving the resonant cavity.

A control loop can be provided which is adapted to adjust at least one of the resonant cavity and a driving laser source coupled with the resonant cavity.

The resonant cavity may be a resonator arrangement of a laser pulse source. Advantageously, the function of the enhancement cavity and the laser cavity are merged so that the structure of the radiation source is more compact compared with the above first variant. Furthermore, phase-locking of an external cavity is unnecessary, thus avoiding instabilities of the locking procedure (pulse shape, frequency comb). Both the driving laser material and the first non-linear medium (frequency conversion target) may be arranged in one single common resonator arrangement (resonator arrangement of a laser pulse source, laser cavity). The laser cavity thus includes the first non-linear medium adapted for providing the HHG radiation by harmonic generation and the second non-linear medium adapted for an amplification of the laser light pulses in the resonant cavity. Advantageously, a femtosecond oscillator can be provided, which includes an integrated frequency conversion on the basis of an harmonic generation process.

Preferably, the resonant cavity is a closed cavity. "Closed cavity" indicates that the resonant cavity has no out-coupling part, in particular, no out-coupling mirror being adapted for coupling laser light pulses out of the resonant cavity. In other words, all cavity mirrors are high-reflective, i.e., the cavity mirrors have maximum reflectivity (at least 99%). The resonant cavity has a finesse being higher than the finesse of a resonator being configured for out-coupling light. On the other hand, the finesse of the resonant cavity is low with regard to the wavelength range of the pulsed coherent radiation emitted at the first non-linear medium, in particular in the UV or XUV wavelength range. To this end, preferably, an out-coupling device for this wavelength range is included in the resonant cavity. The out-coupling device is arranged for out-coupling the HHG radiation out of the resonant cavity. It can comprise a beam splitting device being arranged in or at a boundary of the environment of reduced pressure, or a reflecting solid surface or lattice arranged for a reflection of the HHG radiation, or a transmitting solid surface with a hole arranged for a transmission of the HHG radiation. Typically, the out-coupling device can be contained in a reduced pressure compartment, which is arranged in the resonant cavity.

Turning now to the Drawings, variations are described in the following with exemplary reference to enhancement and laser cavities. Details of those cavities relating in particular to the structure, adjustment, optical set-up and operation are not described here as far as they are known from prior art. In particular, with regard to the harmonic generation process provided with the first non-linear medium and the enhancement of laser light pulses in closed cavities, reference is made to the above publications of C. Gohle et al. and R. J. Jones et al.

FIG. 1 schematically illustrates main features of a radiation source 100, 200 including a resonant cavity 10 with at least two cavity mirrors 11, 12, a first non-linear medium 30 being arranged in a focus position of the resonant cavity 10 and being adapted for harmonic generation of pulsed radiation (HHG radiation), and a further non-linear medium 50 introducing at least one of a predetermined gain and predetermined dispersion into the resonant cavity 10. Typically, the radiation source 100, 200 includes an out-coupling device 40 for emitting the pulsed HHG radiation. For applications of the HHG radiation inside the resonant cavity 10, e.g., for experimental purposes, the out-coupling device 40 can be omitted.

The HHG process in the first non-linear medium 30 is driven by laser light pulses which circulate in the resonant cavity 10. According to a first structure (see below, FIGS. 2, 3), the laser light pulses are generated outside the resonant cavity 10 with a driving pulse laser source. According to a second structure (see below, FIG. 4), the laser light pulses are generated inside the resonant cavity 10 with a laser material.

Figure 2:
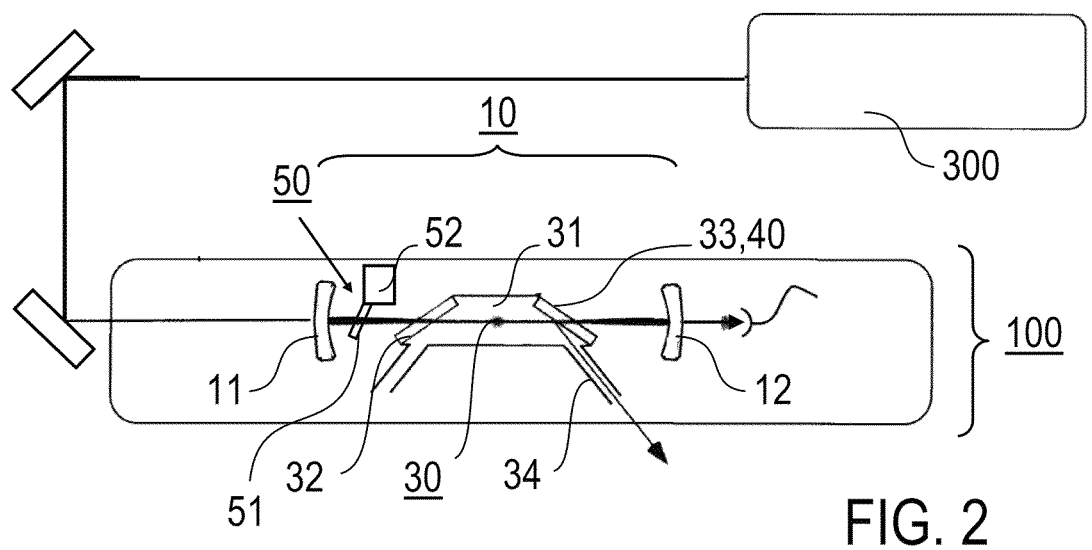
FIGS. 2 and 3: schematic illustrations of the optical set-up of a radiation source according to the first aspect including an external enhancement cavity optically coupled with a driving laser pulse source.

FIG. 2 illustrates a radiation source 100 which includes a resonant cavity 10 with two spherical cavity mirrors 11, 12, a first non-linear medium 30, an out-coupling device 40 and a second non-linear medium 50. The resonant cavity 10 is an enhancement cavity, which is optically coupled with a laser pulse source 300.

The resonant cavity 10 is a linear resonator, wherein laser light pulses generated with the laser pulse source 300 are circulating between only two mirrors 11, 12. In the center of the resonant cavity 10, a focus position is provided, where the beam path of the laser light pulses has a reduced diameter of about 10 μm. Focussing the laser light pulses is obtained by the curved shape of the reflecting surfaces of the mirrors 11, 12.

The first non-linear medium 30 comprises a gaseous jet consisting of, e.g., a rare gas, like Xe. The gaseous jet is arranged in a vacuum compartment 31 with input and output windows 32, 33 being inclined according to the Brewster angle relative to the beam path in the resonant cavity 10. The output window 33 represents the out-coupling device 40 which is used for extracting pulsed HHG radiation from the gaseous jet along an evacuated channel 34 out of the vacuum compartment 31. The extracted pulsed HHG radiation is transmitted, e.g., to an analyzing unit, measurement device and/or lithography device (not shown). Further details of the resonant cavity and the first non-linear medium are found in US 2006/0268949 A1, the subject matter of which is incorporated herein by reference.

The second non-linear medium 50 consists of a single optically non-linear component 51 which has a predetermined gain parameter and a predetermined optical non-linearity. The optically non-linear component 51 is inclined according to the Brewster angle relative to the beam path in the resonant cavity 10. The optically non-linear component 51 comprises, e.g., a crystal having a thickness below 1 mm, preferably in the range of 50 μm to 700 μm. Particularly preferred is a thickness of the optically non-linear component in the range of 100 μm to 500 μm, like, e.g., 200 μm to 300 μm. As an example, the optically non-linear component consists of sapphire having a thickness of about 200 μm to 300 μm.

The optically non-linear component 51 is connected with a drive unit 52, which is arranged for adjusting the position of the optically non-linear component 51 in the beam path of the resonant cavity 10. The drive unit 52 comprises, e.g., a piezoelectric drive. With a wedge-shaped optically non-linear component 51, shifting relative to the beam path allows an adjustment of the gain and dispersion introduced into the resonant cavity 10.

Features (e.g., material, dimensions) and/or adjustment of the optically non-linear component 51 can be selected by those skilled in the art on the basis of theoretical simulations of the optical effect of the component or by experiments. Theoretical simulations can be based on considerations of I. D. Jung et al. ("Optics Letters", vol. 22, 1997, p. 1009 to 1011) or by R. Paschotta et al. ("Appl. Phys. B", vol. 73, 2001, p. 653 to 662), in particular with regard to relationships of dispersion D, pulse duration τ and a self phase modulation (SPM) factor resulting from optical non-linearity. The required cavity dispersion D can be adjusted by using one or several chirped multilayer mirrors as cavity mirrors. During operation of the radiation source, the features and/or adjustment of the optically non-linear component 51 can be optimized with a control loop in dependence on pulse amplitude and shape of pulses circulating in resonant cavity 10.

Figure 3:
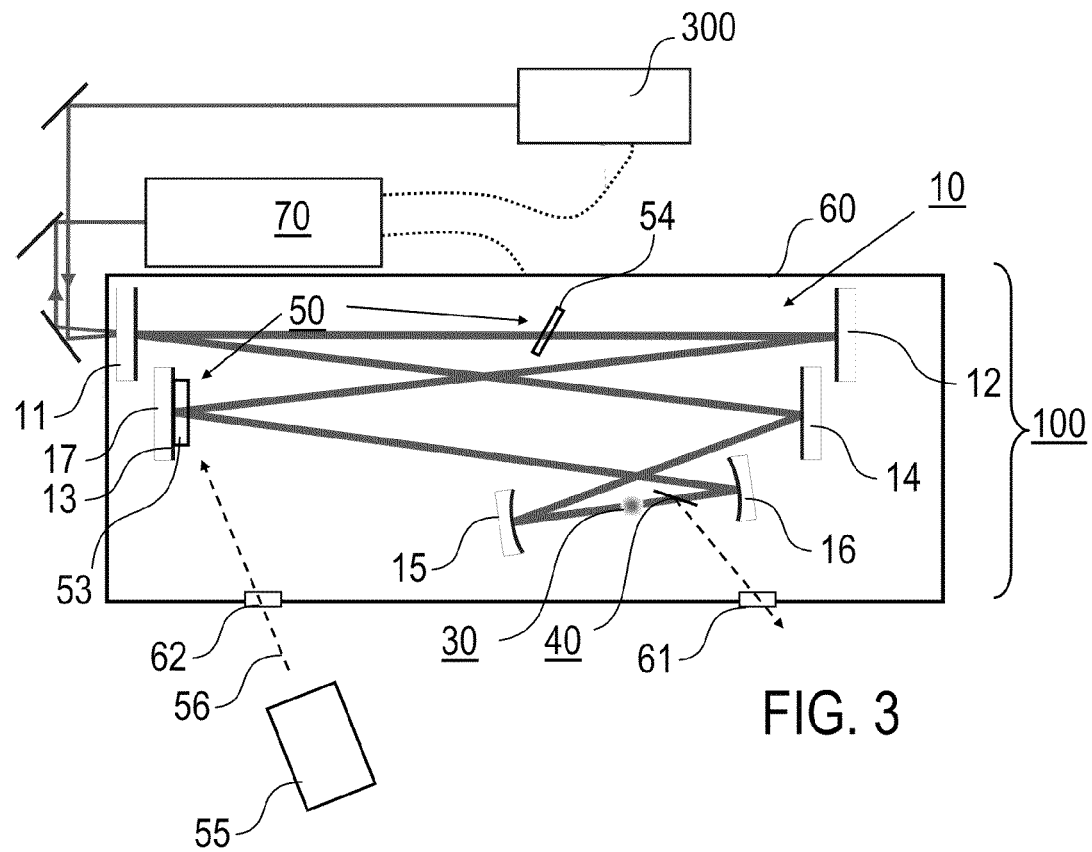

FIG. 3 illustrates another example of a radiation source 100 with a resonant cavity 10 which comprises an enhancement cavity of a ring type spanning a beam path between six mirrors 11 to 16. One or several of the cavity mirrors can comprise chirped multilayer coatings for dispersion compensation purposes. The resonant cavity 10 is arranged in a vacuum chamber 60 having a reduced pressure of about $10^{-2}$ mbar. Two cavity mirrors 15, 16 have a spherical reflecting surface so that a first focus position is provided, where the first non-linear medium 30 is arranged for generating the HHG radiation in the UV or XUV range in a gas jet. The pulsed coherent radiation is emitted through a window 61 of the vacuum chamber 60 to an analyzing unit, measurement device and/or lithography device (not shown).

Laser light pulses generated with a driving pulse laser source 300 are injected into the resonant cavity 10 for coherent addition (enhancement) therein. At least one of the radiation source 100 and the laser pulse source 300 are controlled with a control loop 70 for adjusting the resonant cavity 10 and the laser pulse source 300 relative to each other. Furthermore, the control loop 70 can be used for adjusting a position of at least one component of the second non-linear medium.

With the structure of FIG. 3, the second non-linear medium 50 consists of a first optically non-linear component 53 having a predetermined gain parameter and a second optically non-linear component 54 having a predetermined optical non-linearity.

The first optically non-linear component 53 comprises a crystal of a disk laser, which is arranged in contact with one of the reflecting mirrors 13 of the resonant cavity 10 and a heat sink 17. Component 53 consists of, e.g., Yb:YAG having a thickness of, e.g., 100 μm with the high-reflective mirror coating 13 layered on its rear side. The second optically non-linear component 54 comprises a solid material as described above with reference to FIG. 2. Optionally, a second focus position can be found between reflecting mirrors 11, 12. In this case, the second optically non-linear component 54 would be placed at the second focus position for increasing the efficiency of phase locking in the resonant cavity.

The first optically non-linear component 53 comprises a laser material, which is pumped with an external laser 55 beam as it is known from disk lasers. To this end, a continuous wave pump laser 55, e.g., a fiber-coupled laser diode, is arranged outside the vacuum chamber 60. The pump laser beam 56 is directed through a chamber window 62 of the vacuum chamber 60 onto the first optically non-linear component 53. By adjusting the intensity of laser 55, the efficiency of the amplification process in component 53 can be controlled. The optical set-up of pumping the disk laser can be designed as described with conventional disk lasers (see in particular the above publication of A. Giesen et al. in "Photonics Spectra").

Figure 4:
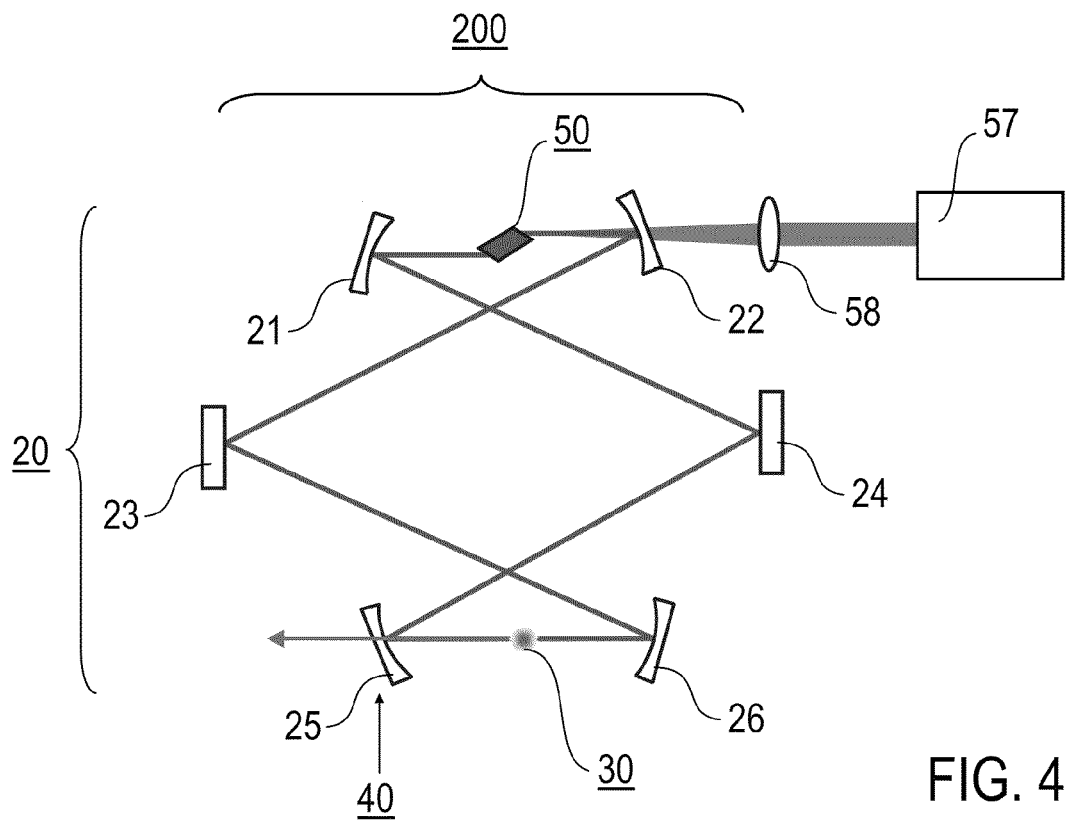
FIG. 4: a schematic illustration of the optical set-up of a radiation source according to the second aspect including an integrated laser and enhancement radiation source.

FIG. 4 illustrates an alternative structure of a radiation source 200, wherein a resonant cavity 20 is provided, which is a ring oscillator including an active laser material 50, which simultaneously represents the second optically non-linear medium, as in conventional mode-locked lasers. With this structure, the driving laser unit and the enhancement cavity are merged into the common resonant cavity 20. Advantageously, a compact optical set-up is obtained.

In detail, the resonant cavity 20 comprises reflecting cavity mirrors 21 to 26, one or several of which can consist of chirped multilayer coatings. The resonant cavity 20 is arranged in a surrounding of reduced pressure, e.g., in a vacuum chamber as shown in FIG. 3.

The reflecting cavity mirrors 25, 26 have curved spherical reflecting surfaces providing a first focus position, where the first non-linear medium 30 is arranged for the generation of HHG radiation. Furthermore, the reflecting cavity mirrors 21, 22 have curved spherical reflecting surfaces providing a second focus position at which the laser material 50 is provided. The laser material 50 represents the second optically non-linear medium in the radiation source 200. It comprises a laser material, e.g., Ti:sapphire or Yb:KGW, which is arranged for both generating laser light pulses circulating in the resonant cavity 20 including amplification thereof. The laser material 50 is pumped with an external continuous wave pump laser 57, which is focused via an optical set-up 58 into the resonant cavity 20.

For generating pulsed coherent radiation, the radiation source 200 according to FIG. 4 is operated like a standard laser. In particular, the laser material 50 is pumped with the continuous wave pump laser 57. Laser light pulses generated with the laser material 50 and circulating in the resonant cavity 20 (fundamental radiation) are coherently added (amplified) up to a peak intensity, which is high enough for driving the harmonic generation of HHG radiation in the UV or XUV range. The HHG radiation is emitted through one of the cavity mirrors 25, which represents the out-coupling device for the UV or XUV range. The resonant cavity 20 does not include an out-coupling device for the fundamental radiation.

The features disclosed in the above description, the drawings and the claims can be of significance both individually as well as in combination.

The invention claimed is:

1. A radiation source that provides high order harmonic radiation (HHG radiation) in a wavelength range below 150 nm, comprising:
   a resonant enhancement cavity that guides laser light pulses generated outside the resonant enhancement cavity with a driving pulse laser source and that includes at least two cavity mirrors, said resonant enhancement cavity being arranged for a pulse superposition by coherent addition of said laser light pulses;
   a first non-linear medium comprising a liquid or gaseous material that provides the HHG radiation by harmonic generation based on an interaction of the laser light pulses with the first non-linear medium, wherein the first non-linear medium is arranged in the resonant cavity in an environment of pressure lower than atmospheric pressure; and
   a second non-linear medium arranged in the resonant enhancement cavity and adapted for at least one of amplifying the laser light pulses by addition of a predetermined amount of gain such that effective losses in the resonant enhancement cavity are compensated and phase locking longitudinal modes of the laser light pulses by addition of a predetermined optical nonlinearity such that material dispersion in the resonant enhancement cavity is compensated.

2. The radiation source according to claim 1, wherein:
the at least two cavity mirrors include imaging mirrors having a curved reflecting surface so that at least one focus position is included in the resonant enhancement cavity, and
the first non-linear medium is arranged at a first focus position of the resonant enhancement cavity.

3. The radiation source according to claim 2, wherein the second non-linear medium is arranged at a second focus position of the resonant enhancement cavity.

4. The radiation source according to claim 1, wherein the out-coupling device comprises at least one feature:
the out-coupling device comprises a beam splitting device arranged in or at a boundary of the environment of reduced pressure lower than atmospheric pressure;
the out-coupling device comprises a reflecting solid surface or lattice arranged for reflection of the pulsed coherent radiation, or a transmitting solid surface with a hole arranged for transmission of the pulsed coherent radiation; and
the out-coupling device is contained in a reduced pressure compartment having a pressure lower than atmospheric pressure and arranged in the resonant enhancement cavity.

5. A method of generating high order harmonic generation of pulsed HHG radiation with a wavelength of 2 nm to 150 nm, comprising:
providing a resonant enhancement cavity that includes at least two cavity minors, generating laser light pulses with a driving nuke laser source outside the resonant enhancement cavity,
coupling said laser light pulses into the resonant enhancement cavity and coherent addition of said laser light pulses within said resonant enhancement cavity,
providing the HHG radiation by harmonic generation based on an interaction of the laser light pulses with a first non-linear medium contained in the resonant enhancement cavity, wherein the first non-linear medium is arranged in an environment of pressure lower than atmospheric pressure, and
subjecting the laser light pulses to at least one of amplifying the laser light pulses by addition of a pre-determined amount of gain such that effective losses in the resonant enhancement cavity are compensated and phase locking longitudinal modes of the laser light pulses by addition of a pre-determined optical non-linearity such that material dispersion in the resonant enhancement cavity is compensated, wherein a second non-linear medium is used which is arranged in the resonant enhancement cavity.

6. The method according to claim 5, wherein generating the HHG radiation comprises generating radiation pulses of the n-th harmonic, with n is an odd natural number, with n>5.

* * * * *